United States Patent [19]

Linde et al.

[11] 4,015,273

[45] Mar. 29, 1977

[54] TYPE CARRIERS

[75] Inventors: Hans Linde; Horst Maecker, both of Berlin, Germany

[73] Assignee: H. Berthold A.G., Germany

[22] Filed: Apr. 21, 1975

[21] Appl. No.: 569,956

[30] Foreign Application Priority Data

May 15, 1974 Germany .......................... 2423952

[52] U.S. Cl. .................................. 354/15; 354/13; 354/19

[51] Int. Cl.² .................... B41B 17/32; G03B 17/06

[58] Field of Search .................. 354/13, 15, 16, 18, 354/19

[56] References Cited

UNITED STATES PATENTS

| | | | |
|---|---|---|---|
| 3,721,174 | 3/1973 | Tidd | 354/13 |
| 3,738,236 | 6/1973 | Grube et al. | 354/15 |
| 3,886,566 | 5/1975 | Moyroud et al. | 354/15 |

*Primary Examiner*—Stephen J. Tomsky
*Attorney, Agent, or Firm*—Basile, Weintraub and Vanophem

[57] ABSTRACT

A type carrier of the type that is clipped to a rotary cylindrical holder-carrier device. The type carrier is suitable for selecting chosen type symbols in photocomposing machines wherein several type carriers with different groups of type symbols and/or code information are sequentially distributed around a peripheral cylindrical surface. This arrangement is characterized by the fact that the flat type carrier consists of a thin sheet of elastic material capable of being deformed to a partial cylindrical segment and that the material so used is of the type which is practically insensitive to mechanical effects such as temperature variation. The type carrier is located on the inside peripheral surface of the cylindrical carrier-holding device.

5 Claims, 4 Drawing Figures

TYPE CARRIERS

BACKGROUND OF THE INVENTION

I. Field of the Invention

The invention concerns itself with type carriers used in the selection of type symbols in photocomposing machines. Specifically, the invention deals with type carriers which can be clipped to a rotary cylindrical carrier roll, and more specifically with the case where several such type carriers, containing different groups of type symbols and/or code information, are sequentially arranged around the circumference of the cylindrical carrier roll.

II. Description of the Prior Art

Such type carriers are already known (DT-OS2,242,308) West German Patent No. This type of carrier roll for type symbols consists of an arrangement in which several segments are rigidly fixed by screws to the peripheral surface of a disk, each segment containing a group of type symbols or the like. The group of type symbols is adhesively fixed to the outer periphery of the individual rigid carrier segments in the form of a film. As in the case of most of the other photo composing machines known to the art, which work at high composing rates, the machine in question for this invention also is based on the principle that the type setting of the respective type symbol is done by means of a corresponding arrangement of optical elements onto a light sensitive layer while the carrier roll is in motion. To this effect, the cylindrical or disk-like carrier roll is in continuous motion at a relatively high rate of speed, and a flash illumination source is set off at that instant when the desired type symbol, or whatever, passes through the reproduction optics. Exposure is for such a short period of time that the continuing motion of the type symbol can be neglected.

The use of rigid segments as type carriers which can be fastened by means of screws onto a disk or another circular supporting device has the considerable advantage that they can be fastened to the carrier in such a manner that, even for high rates of revolutions and the centrifugal forces arising from this, they are not subject to slipping or other deformation effects; this makes it possible to avoid any of the reproduction flaws otherwise caused by these circumstances. The disadvantages of this design known to the state of the art, however, are that the film which is adhesively fixed to the outside surface of the individual segments, and which carries the type symbols, can easily be damaged by mechanical action. In addition, for a multiplicity of different types, as they are a necessity for photocomposing machines which are to be used at high rates of efficiency, a large stock of cylindrical segments is required, taking up considerable storage space.

Apart from the possibility of building a cylindrical type carrier composite from sequentially arranged rigid segments, it is also known in the art to use a respective cylinder to which filmstrips are clipped. For instance, a matrix-strip on a carrier frame of a photocomposition machine is known to the art (DTOS 2 246 603) West German Patent No. In this case guide openings are provided on the carrier frame for attaching the matrix-strip, and negative matrix-symbols and negative time slots are arranged opposite of each other on the opposing sides of the matrix-strip in certain spatial relationships to each other, and one end of the matrix-strip can be suspended from one end of the carrier frame, while the other end is provided with openings into which a spring element on the carrier frame can enter for the purpose of securing this end to the carrier frame.

It is a salient feature of this arrangement that the matrix-strip is again located on the outer peripheral surface of a disk or cylinder, and that, given a high loading force in the spring element, such a unit is difficult to manipulate and to install, or, should the spring tension be suitably redirected for easy handling, the danger exists that slippage or dislocation of the matrix-strip would occur during rapid rotation of the cylinder because of the centrifugal forces generated. Apart from the installation difficulties, and the reduced precision in setting type due to centrifugal forces, for the known device the exact alignment in mounting suffers on frequent use. Finally, temperature variations inside and outside the photocomposition machine may cause changes in the filmstrips employed.

In addition, a photocomposition machine is known which features a symbol-carrying matrix, a flash-exposure system to illuminate the symbols, and an optical system for projecting type onto an image surface (DT-OS 2024366) West German Patent No., in which the type carrier consists of film which has been clamped between rigid arc-shaped frames, which themselves are fastened to a cylindrical carrier. Again, this type carrier arrangement is subject to a lack of precision in the composing of individual symbols due to position changes caused by centrifugal forces. Changes in the dimensional tolerance factors caused by repeated mountings lead to deteriorations in the alignments. In addition, there is the consideration that film as such, when employed as carrier for the type symbols, hardly can result in high quality type setting, and that the unavoidable static charging of the film will result in soiling of the type symbols, even after relatively short usage. This soiling quickly becomes apparent in the projected picture or even the final product.

Thus, the requirements made for the type of photocomposing machine here under discussion, i.e., to have available a large number of intermingled, different type symbols for one composing process; to be able to project these onto a light-sensitive film in as short as possible a time, using a continuously rotating type carrier and a flash-illumination source, and to do so at very high composing quality standards. These requirements are indeed not completely met by the devices heretofore known to the art, or if so, are only met while accepting other disadvantages. The same is also true for the case of designs which allow for a relatively fast and simple exchanging of individual type carrier elements on a supporting device, which upholds the alignment requirements during repeated usage.

The same also holds for a further type carrier cylinder (DTAS 1 945 552) West German Patent No., on which each letter or each symbol can be singly mounted in an interchangeable manner. The individual type carriers are provided with a permanent magnet on their front side and can be made to stick to corresponding rings at the edge of the cylinder on any given spot of the periphery. In this design, the cylinder surface is provided with uniform perforations on several peripheral locations and in several tiers above each other; this for the purpose of allowing the projected light to pass and providing the necessary code information. The rings are fastened to striker bars, which again are fastened by screws to support elements on the cylinder.

When part of the type carrier elements are to be exchanged as a unit, it is necessary to disassemble the striker bar with the type elements immediately attached to it by removing the screws. The type carrier elements located in the immediately adjoining row thereby lose their second support surface, since the removed striker bar with its ring and the attached type carrier elements simultaneously double as the support surface for the second row of type carrier elements in the next row. The type carrier elements must be disengaged individually and at significant expenditure of time from the striker support plate, only to be replaced by others. Even the changing of the type carriers on the cylinder requires a considerable expenditure of time, since one set of type symbols includes as many as 120 individual characters. For the case where several type carrier segments are removed from one side of the cylinder, an imbalance is created in the cylinder, which in turn puts a considerable load on the bearings and the drive mechanism. Also, the magnets used in the described design are quite sensitive to shock. Metallic dust on the permanent magnets of the type symbol carriers does allow for the possibility of improper alignment.

Each individual type carrier element must be kept clean to achieve sharp images, since soiling occurs relatively quickly by static charging. The bilateral cleaning of hundreds of type elements is very time consuming.

SUMMARY OF THE INVENTION

It is from this level of the state of the art that the present invention takes as its objective to further develop a type carrier design of the above-described characteristics to the effect that temperature variations, frequent exchange of the carrier elements on the support base, the centrifugal forces encountered during rotation on cylindrical support carriers, and other factors, will no longer have disadvantageous effects on the stability of the individual type elements, and thereby on the quality of the type setting onto light sensitive material. At the same time, exchanging individual type carrier segments is to be a quick and simple operation which can be carried out with safety and precision, and the type carrier segments are to be comparable in stability to those of the above-described cylindrical segments and are to be capable of space-saving storage.

This objective is achieved in accordance with the design features detailed in the principal claim. Additional advantageous developments and extensions of the invention are described in the subsequent derivative claims.

The design of the type carrier elements in accordance with this invention and their special features of attachment to the cylindrical carrier device make it possible to store them in large numbers as planar units on top of each other in a space-saving fashion. When they are clamped into the supporting device, they will behave like rigid, shaped cylinder segments of excellent mechanical stability due to their elastic properties and thereby result in excellent type setting characteristics. The centrifugal forces arising during high rotational rates of the cylinder drum can only lead to an improvement of the stability of the type carrier segments on the support device and cannot lead to unintended positional slipping and unalignment. The material of construction used for the type carriers reduces the previously described negative effects of temperature variations to insignificance. The exchange of individual type carrier elements can be made extremely quickly and without difficulties. Special fastening devices for the fixation of the type carrier elements in their working positions become superfluous so that, in fact, only a small number of individual parts remain for the assembly of the total device.

The use of thin glass for the type carriers is especially advantageous in comparison with the use of film, since thereby a series of inaccuracies can already be avoided during the manufacture of the type carriers; for instance, such inaccuracies as are contributed by the photographic development process by the above-mentioned temperature effects during development and drying of the film and also those arising within the photocomposing machine. The type images are characterized by sharp, crisp contours, even when the type carrier rotates continuously at high revolutions. The thin glass adapts in a satisfactory elastic manner to the cylindrical carrier device and has excellent resistance against mechanical effects.

The objects, advantages, and applications of the present invention will become apparent to those skilled in the art of type carriers when the following description of the best mode contemplated for practicing the invention is read in conjunction with the accompanying drawings.

BRIEF DESCRIPTION OF THE DRAWINGS

The attached drawings describe one design example of the invention; the respective figures are as follows.

DESCRIPTION OF THE PREFERRED EMBODIMENT

Figure 1:
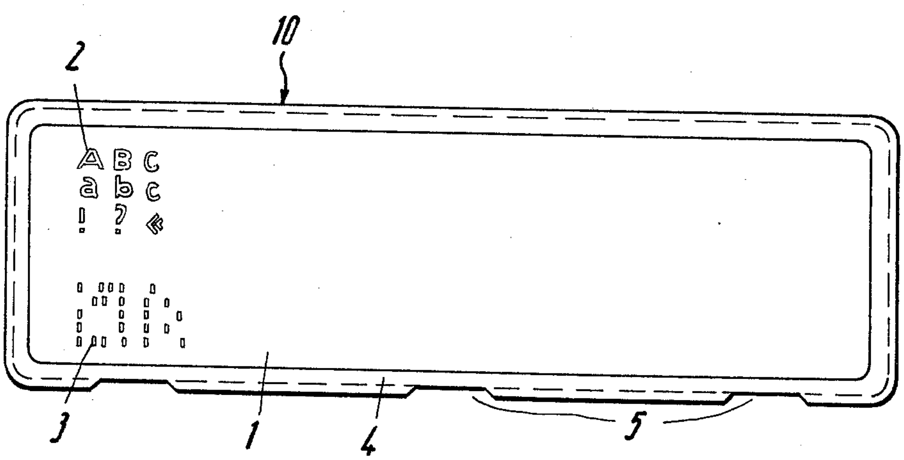
FIG. 1 is a top view of the type carrier element in simplified form.

The type carrying segment 10, represented in simplified manner in FIG. 1, consists essentially of a thin glass plate 1, which is surrounded by a protective edge 4. In place of the glass plate 1, a type carrier segment may be fashioned from any other corresponding material of construction, as long as it has comparable mechanical properties and exhibits sufficient elasticity so that the carrier segment 10, without being subjected to external forces, continues to remain a planar element, but once subjected to pressure for instance, will reversibly assume a partial cylindrical shape. On the surface of the type carrier segment 10 are located the type symbols 2 and/or code information elements 3; these may have been created by the familiar photographic processes or by other means, and stand out in sharp contours from the rest of the surface of the carrier element and allow the passage of light. The arrangement of the type symbols and code symbols is by lines and rows in such a manner that for the described example the upper half of the type carrier segment carries the letters, while the lower half carries the code information.

The protective edge 4, which is intended to protect the glass plate 1 from damage, encloses the plate in a frame-like fashion and has characteristic notches 5 along the long lower edge of the type carrier 10; these provide for the exact alignment of the type carrier within its mounting device. A suitable material of construction for this protective edge 4 is a plastic of sufficient elasticity and flexibility to provide for the intended protective function. The protective edge may be a T-profile in cross-section; however, a rectangular or other profile is also quite acceptable.

The code information on the carrier 10, i.e. the signal triggering information elements, are applied to the glass plate in binary form by an easy procedure involving electronics, which is, for our case, of no special interest.

Figure 2:
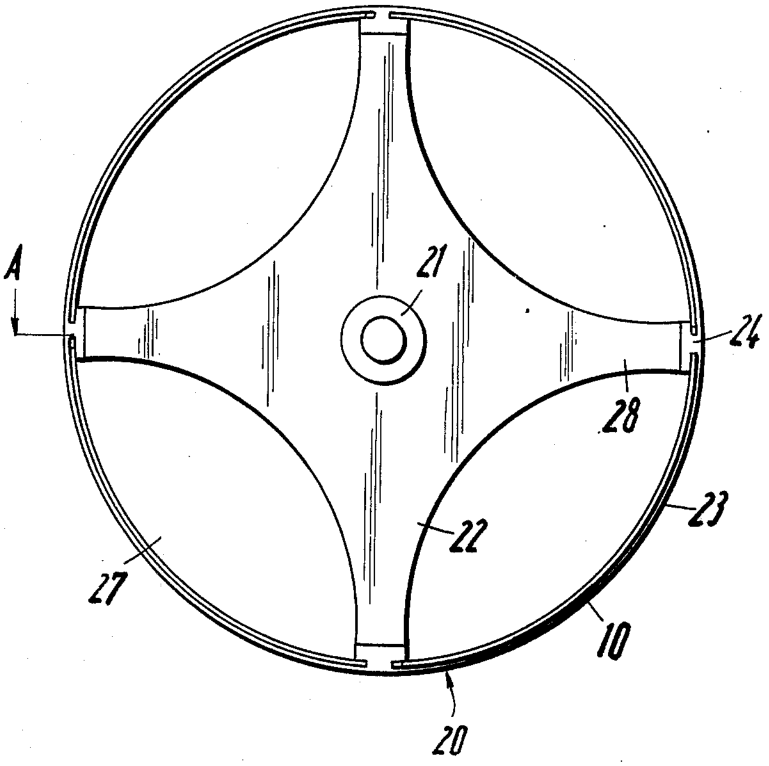
FIG. 2 illustrates the arrangement of four type carrier segments in the respective supporting device.

The carrier device 20, which can accomodate several type carriers according to FIG. 1, is schematically represented in FIG. 2. The holder-carrier consists of a cylinder or cylindrical body 23 and a disk 22 which can be rotated around a hub 21 and is built into the photocomposing machine. The outer peripheral surface of the cylinder body 23 is fastened on four locations to disk 22, which is designed to incorporate the four segment-like openings 27. The cylindrical body 23 provides a guidance and support frame for four type carriers 10, which are inserted in the described manner between the terminal sections of the support struts 28, disk 22, and the inside peripheral surface of the cylindrical body 23. The clearance, measured along the curvature between two adjoining guidance grooves 24 within the support struts 28, corresponds to the width of the type carrier 10, so that the carrier can be fitted snugly between two of the support struts, while its upper and lower edges are pressed firmly against the frame provided by the cylinder 23. At least for the area of one type carrier 10 carrying the type symbols and other data within the protective frame 4, the outer peripheral wall of cylinder 23 is open so that a stationary light source, located within the holder-carrier 20, can project its light radially through a projection optical arrangement, through the respectively chosen type symbol located on one of the four type carriers, onto a light sensitive film which has been moved into the correct location outside of the holder-carrier device. In order to compensate for any possible deviations of the type carriers from the cylindrical shape, tension devices can be installed which exert an additional pressure onto the side edges of the type carriers in the direction of arrow A. These forces from the tension device are activated by centrifugal force.

Figure 3:
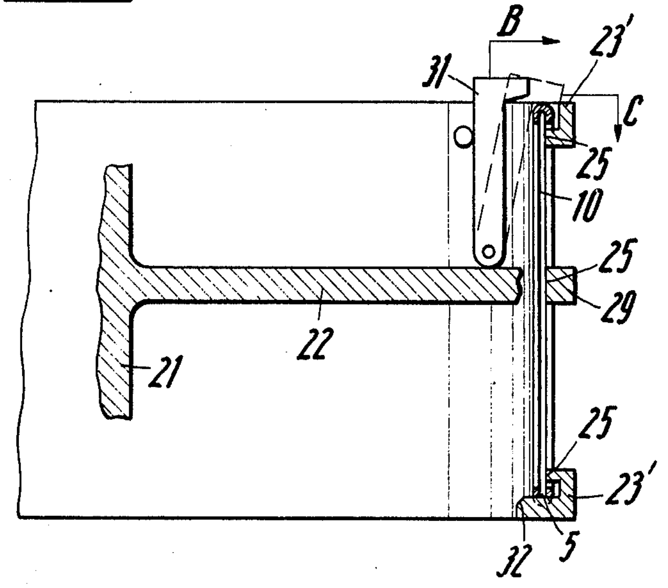
FIG. 3 illustrates a preferred example of a mounting device for the type carriers, which takes advantage of the centrifugal forces generated.

A radial cross-sectional view of half the carrier-holder 20 of FIG. 2 is shown in FIG. 3. The disk 22 and hub 21 are only schematically represented. The type carrier 10, which is elastically deformed to a cylinder segment and located between the two support struts 28, is on the inside of the frame-like cylinder body 23. Cylinder body 23 is composed of upper and lower support frames 23' which are arc-shaped over their total length. In addition, a further centrally located support frame 29 is provided which connects with the centrally located disk 22 on the cylinder 23. The type carrier 10 is located radially inside in the manner apparent from FIG. 3; it rests on the support frame 32 of the lower frame section of cylinder 23 with notches 5 and is contained in cylinder 23 within the grooves of the upper and lower frame elements 23' by its upper and lower protective edges. Its cylindrical shape is provided by being pressed against the surfaces 25. Along the upper edge of the cylindrical carrier-holder movable arresting devices 31 are located. Their side leg, which points more or less radially toward the outside, is pulled in the direction of arrow B when the holder-carrier rotates; this occurs because of the centrifugal forces generated on rotation. Because of the slightly slanted design of the lower edge of the vertically positioned arm, it will exert a force in the direction of arrow C onto the type carrier 10, and the type carrier within the holding frame is increasingly forced onto the support frame 32 and held in position as the rotational speed increases. The type carrier, which on insertion into the holder-carrier 20 already is firmly pressed against the inside of the cylinder 23, cannot be subjected to additional deformation or misalignment, even at high rotational speeds. Since the alignment of the type carriers is independent of the centrifugal forces, the positional exactness required for photocomposition is maintained unchanged.

Figure 4:
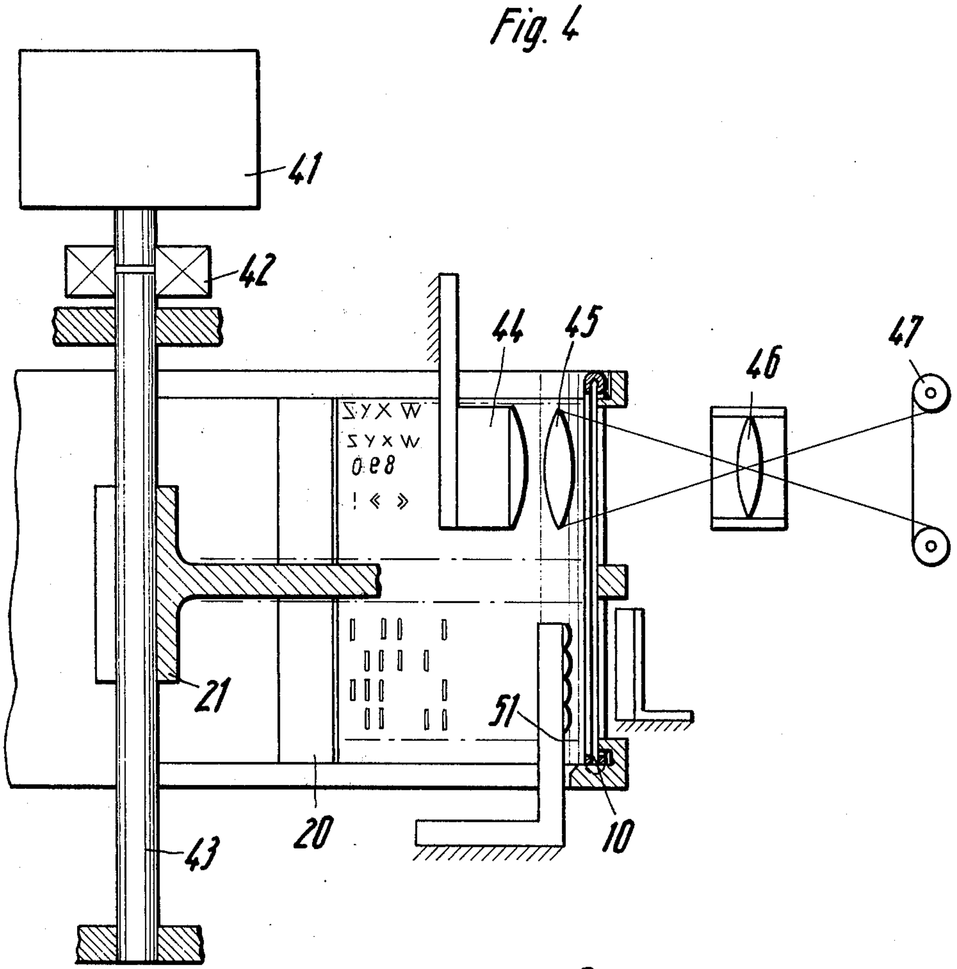
FIG. 4 illustrates a sectional view through part of the carrier device with type carriers and reproduction optics within a photocomposing machine, in a schematically simplified manner.

FIG. 4 shows in part, and in schematic form, the type carriers 10 as they are held in the holder-carrier 20, in conjunction with the projection optics. Accordingly, the holder-carrier 20 is connected via its hub 21 to an axle 43, which via gears 42 is rotated by motor 41. Within the upper half of the cylinder, and thereby holder 20, a stationary light source 44 is located within the photocomposing machine; this light source consists of a flash unit capable of emitting flashes at a high rate of frequency. The light is beamed through lense 45 and projected as preferably parallel light through the continuously rotating circumference area of the carrier-holder 20, and thereby through the type carrier 10 onto the projection optic 46, which at the same time contains an optical selection system, so that finally sequentially chosen type symbols are imaged onto the light-sensitive film 47. The signal triggering code information located on the lower half of type carrier 10 is read by means of the code readers 51 and 52, and the signals generated are received by an electronic control center.

What is claimed is as follows:

1. A type symbol selecting device designed to be used in photocomposing machines, said device comprising:
   - a plurality of identical type carriers with different groups of type symbols and/or code information, each of said type carriers comprising a thin sheet of elastic material, surrounded by a protective edge and having a deformable cylindrical segment shape and a normal flat storable shape;
   - a cylindrical holder-carrier comprising a cylindrical body and a centrally situated disk;
   - means releasably clipping several of said type carriers to said holder-carrier on a peripheral surface of said cylindrical body such that said attached type carriers are sequentially located next to each other and are uniformly distributed around said peripheral surface of said holder-carrier, said type carriers being separated from each other by a plurality of support struts on said central disk;
   - a guidance groove located on said disk, said type carriers being inserted into said guidance groove; and
   - said releasably clipping means comprising a plurality of arresting devices located along the upper edge of said cylindrical body, said arresting devices providing a force to hold said type carriers in place when the holder-carrier is rotated, said force being proportional to the centrifugal force generated during rotation.

2. The type symbol selecting device defined in claim 1 wherein said thin sheet of elastic material is a sheet of thin resilient glass.

3. The type symbol selecting device defined in claim 1 characterized by the fact that the type carriers which are deformed into partial cylindrical segments by pressure forces are subsequently located next to each other on the interior peripheral surface of the holder-carrier and are uniformly distributed around said holder-carrier; a plurality of support struts carried by said centrally situated disk, the type carriers being separated from each other by said support struts, said disk having a plurality of guidance grooves for receiving said type carriers.

4. A type symbol selecting device designed to be used in photocomposing machines, said device comprising:

a plurality of identical type carriers with different groups of type symbols and/or code information, each of said type carriers comprising a thin sheet of elastic material, surrounded by a protective edge and having a deformable cylindrical segment shape and a normal flat storable shape;

a cylindrical holder-carrier comprising a cylindrical body and a centrally situated disk;

means releasably clipping several of said type carriers to said holder-carrier on a peripheral surface of said cylindrical body such that said attached type carriers are sequentially located next to each other and are uniformly distributed around said peripheral surface of said holder-carrier, said type carriers being separated from each other by a plurality of support struts on said central disk; and a guidance groove located on said disk, said type carriers being inserted into said guidance groove.

5. The type symbol selecting device defined in claim 4 wherein said thin sheet of elastic material is a sheet of thin resilient glass.

* * * * *